United States Patent [19]

Solleder et al.

[11] Patent Number: 4,699,230
[45] Date of Patent: Oct. 13, 1987

[54] SUSPENSION OF AN AXLE GEAR CASING FOR MOTOR VEHICLES

[75] Inventors: Otto Solleder, Leutenbach; Helmut Flemming, Hochdorf; Werner König, Stuttgart; Einhard Kleinschmit, Esslingen, all of Fed. Rep. of Germany

[73] Assignee: Daimler-Benz Aktiengesellschaft, Stuttgart, Fed. Rep. of Germany

[21] Appl. No.: 800,803

[22] Filed: Nov. 22, 1985

[30] Foreign Application Priority Data

Nov. 22, 1984 [DE] Fed. Rep. of Germany ....... 3442584

[51] Int. Cl.$^4$ ............................................. B60K 23/00
[52] U.S. Cl. ...................................... 180/73.1; 180/75
[58] Field of Search ................... 180/88, 71, 73.1, 75, 180/85, 56, 76

[56] References Cited

U.S. PATENT DOCUMENTS

| 1,435,355 | 11/1922 | Weaver | 180/73.1 |
| 2,369,501 | 2/1945 | Wagner | 180/73.1 |
| 2,758,662 | 8/1956 | Pekas | 180/73.1 |
| 3,402,783 | 9/1968 | Trachte | 180/73.1 |

FOREIGN PATENT DOCUMENTS

| 1530516 | 10/1969 | Fed. Rep. of Germany | 180/73.1 |
| 536122 | 6/1958 | Italy | 180/73.1 |

Primary Examiner—John J. Love
Assistant Examiner—Everett G. Diederiks, Jr.

[57] ABSTRACT

This invention relates to a suspension of an axle gear casing for motor vehicles comprising at least two elastic suspension elements, with one of the suspension elements arranged in front of the axle shaft and the other one arranged behind the axle shaft, in alignment with one another in the longitudinal direction of the vehicle and offset to the side of the longitudinal axis of the gear casing, wherein coordination of the stiffnesses of the suspension elements causes a rotating movement of the axle gear casing opposing a movement of the axle gear casing that occurs under the influence of the driving reaction moment from the vehicle wheels and engine drive and which normally shifts the front end of the casing correspondingly in the upward direction to maintain the position of the drive shaft of the axle gear with respect to a center of a flexible disk of a driving cardan shaft to ensure that a change of angle between the drive shaft and the cardan shaft is limited to a tolerable extent.

14 Claims, 6 Drawing Figures

4,699,230

SUSPENSION OF AN AXLE GEAR CASING FOR MOTOR VEHICLES

BACKGROUND AND SUMMARY OF THE INVENTION

This invention relates to the suspension of a rear axle gear casing for motor vehicles wherein driving forces are transmitted from the cardan shaft and the drive shaft to the rear axle shafts via the rear axle gear casing.

Rear axle gears of motor vehicles which, in a conventional way, are driven by means of a cardan shaft extending in the driving direction and transmitting the drive to the wheels by means of transversely extending axle shafts, are subject to moments of reaction during the driving which are effective around the axes of the cardan shaft (cardan shaft moment) and also around the transversely located axis of the axle shafts (starting moment). In this case, the reaction moments, corresponding to the gear reduction provided in the axle gear casing, are at a certain proportion to one another and must be absorbed in the suspension points of the axle gear casing at the vehicle body.

In the case of an elastic suspension of the rear axle gear casing, the mentioned reaction moments cause movements of the axle gear casing around the axis defined by the resulting momental vector. These movements are especially present when the elastic suspension elements have a high coefficient of elasticity, which is desirable for the purpose of noise reduction.

Such movements result in a change of the angle between the axis of the drive shaft of the rear axle gear and the axis of the cardan shaft driving it. This angle change causes additional stress which reduces the durability of a flexible disk that is conventionally inserted between the cardan shaft and the gear drive shaft. The angle change also increases the inbalance in the momental transmission, in addition to noise and vibrations.

A known suspension for a rear axle gear casing of the above-mentioned type is shown and described in German Unexamined Published Application (DE-OS) No. 15 30 516. In the case of this construction, the front and the rear suspension elements of the gear casing are staggered with respect to the longitudinal central axis of the gear in such a way that a straight line connecting these elements with one another is perpendicular to the resulting momental vector and is thus located in the momental support plate. The resulting forces can therefore all be absorbed in the suspension points.

In the case of the above-mentioned German Unexamined Published Application (DE-OS) No. 15 30 516, the elastic suspension elements are stressed by tension or pressure by the resulting driving forces with the result that the gear casing, corresponding to the elasticities existing in the suspension elements, can swivel around an axis that is defined by the resulting momental vector. As a result, angle changes occur between the drive shaft and the carban shaft, which changes may exceed the permissible extent, especially when a high coefficient of elasticity is chosen for the suspension elements during peak loads.

The present invention is therefore based on the objective of providing a suspension for axle gear casings which, in the case of a sufficiently high elasticity of the suspension elements, can absorb starting and cardan shaft moments without the occurrence of undesirably large changes of the angle between the drive shaft and the cardan shaft.

The particular predetermined configuration of the suspension elements achieves this objective.

The development according to the invention has the result that in the case of the occurring loads, swivel movements of the axle gear casing come together in space, such that the superimposing movements that result from the cardan shaft moment and the starting moment overlap in opposite directions. The resulting compensation has the effect that relatively soft suspension elements may be used without causing unacceptably large changes of the angle between the drive shaft and the cardan shaft.

Preferred embodiments of the invention include a suspension system wherein at least one of the suspension elements is located behind the rear axle shaft. Other preferred embodiments include a suspension system having two suspension elements that are aligned with one another in the longitudinal direction of the vehicle. These configurations are advantageous in regard to the arrangement of the axle gear casing relative to the vehicle body.

Other preferred embodiments of the invention include a suspension system wherein both suspension elements are subject exclusively to a load in the radial direction.

The above characteristic is advantageous in that the suspension elements may be arranged identically with respect to the longitudinal central axis of the axle gear casing, and further, be designed identically.

Further objects, features, and advantages of the present invention will become more apparent from the following description when taken with the accompanying drawings(s) which show, for purposes of illustration only, an embodiment 1 several embodiments in accordance with the present invention.

DETAILED DESCRIPTION OF THE DRAWINGS

Figure 2:
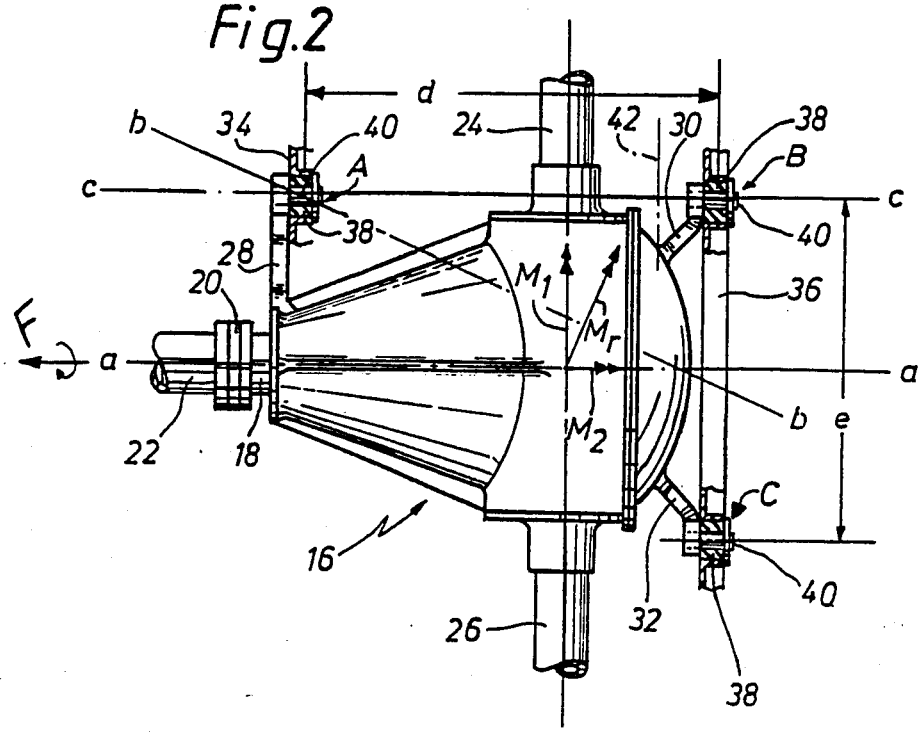
FIG. 2 is a schematic view of the rear axle casing taken along Line II—II of FIG. 1.
Figure 1:
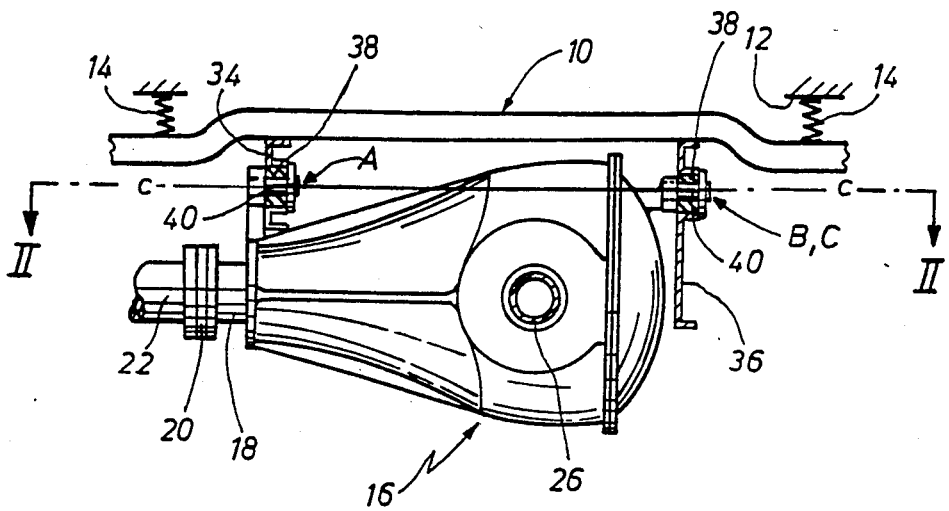
FIG. 1 is a side view of a dear axle gear casing suspended in an elastically flexible way at a rear axle carrier of a passenger car by means of three suspension elements, constructed in accordance with a preferred embodiment of the present invention.

In the case of the embodiment shown in FIGS. 1 and 2, the reference number 10 shows a rear axle carrier of a passenger car that forms a driver's carrying part. The rear axle carrier 10 is suspended at the floor 12 of the body of the vehicle via elastic connecting members 14, of which only two are shown in FIG. 1.

At the underside of the rear axle carrier 10, a rear axle gear casing 16 is elastically flexibly suspended by means of three elastic suspension elements A, B and C, the physical arrangement of which is explained in further detail below.

The rear axle gear casing 16 has a differential gear, for example, a differential gear with bevel wheels, that is known. Equipped with a bevel wheel, the drive shaft 18 is guided out of the front end of the casing, and by means of a drive disk joint formed by a flexible disk 20, is connected in a rotationally stable manner with a cardan shaft 22. Through this rotationally stable connection, the torque is transferred from the vehicle gear change box to the differential gear. The rotating direction of the cardan shaft is indicated by an arrow in FIG. 2.

Rear axle shafts 24 and 26 extend from the rear axle gear casing to each rear driving wheel of the vehicle, said rear axle shafts 24 and 26 being located approximately in a common plane that is perpendicular to the plane in which the drive shaft 18 is located.

The two rear axle shafts do not participate in the guiding of the wheels. To allow the rear axle shafts to move corresponding to the elastic movements of the driving wheel, which guiding wheel is guided by the wheel guiding members, the rear axle shafts are equipped with two cardan joints, of which one joint is located in the area close to the wheel and the other one is located in the area close to the gear casing. For reasons of simplicity, details of the cardan joints are not shown.

As shown in FIGS. 1 and 2, of the suspension elements A, B and C carrying out the suspension of the rear axle gear casing 16, one (A) is located in the front area of the casing or in front of the rear axle shafts 24, 26 and the two others (B, C) are located in the rear area of the casing or behind the two axle shafts 24, 26. The forward driving direction F of the passenger car is indicated by an arrow entered in front of the cardan shaft 22. The two suspension elements A and B are located at the right side of the rear axle gear casing, preferably having the same lateral distance from the longitudinal central axis a—a of the casing and preferably located in a common longitudinal plane. The two rear suspension elements B, C are preferably located in a joint vertical plane. All suspension elements, by means of one supporting arm 28-32 respectively, are connected with the rear axle gear casing 16 and are held in respective holding devices 34, 36 provided at the underside of the rear axle carrier 10. As shown in FIG. 2, the holding device 36 receives the two rear suspension elements B, C which, as seen in a top view according to FIG. 2, are preferably located symmetrically to the longitudinal central axis a—a of the casing 16.

When the passenger car moves in the forward direction, reaction torques are created around the axis of the drive shaft 18 and also around the axis of the rear axle shafts 24, 26. These reaction torques are of varying magnitude due to the fact that the reaction torque around the rear axle shafts is larger than the reaction torque around the axis of the drive shaft 18 according to the reduction ratio of the bevel wheels of the differential gear. In FIG. 2, the vector of the reaction torque around the axis of the rear axle shafts 24, 26 (starting moment) has the reference symbol $M_1$, and the vector of the reaction torque around the axis of the drive shaft (cardan shaft moment) has the reference symbol $M_2$. These two reaction torques result in a reaction torque having the reference symbol $M_r$, which reaction moment vector is perpendicular to a support plane b—b.

The arrangement of the two suspension elements A, B, with respect to the reaction moment support plane b—b and the coordination of their stiffnesses, is carried out in such a way that under the influence of the resulting reaction torque $M_r$, the rear axle gear casing 16 adjusts itself relative to the rear axle carrier 10 in such a way that the drive shaft 18 and the cardan shaft 22 are essentially aligned with one another or, have an angular position with respect to one another at the flexible disk which is within tolerable limits. As a result, the dry disk joint or the flexible disk 20 is subjected to no more than tolerable stresses which do not noticeably impair its durability. As a result, excess noise and vibration in the area of the dry disk joint are largely avoided.

While in the state of the art described in the introduction to the specification it is assumed that undesirable movements due to the occurring moments are suppressed or limited by the fact that the supporting of the moments takes place in a plane containing the resulting momental vector, the invention takes a different approach. The method of supporting the occurring moments is intentionally not designed in such a way that by means of its inflexibility, the forces caused by the moments are absorbed. In preferred embodiments of the invention, movements that result from the moments or forces are permitted, but only in a sense of a mutual compensation. As a result, it becomes possible to suspend softly and still hold the connection point between the cardan shaft and the drive shaft in its original position.

In the shown embodiment according to FIG. 2, this result is achieved by the fact that the starting moment $M_1$ first causes a swivel movement in the sense of a lifting-up at the end on the side of the cardan shaft and that onto this swivel movement an opposite swivel movement is superimposed, which is caused by the cardan shaft moment. Because of the use of elastic suspension elements, an ideal swivel axis exists which adjusts itself as a function of the chosen elasticity of the suspension elements A, B and C. In the shown embodiment, this ideal swivel axis extends approximately in the longitudinal direction of the vehicle, in which case the coupling point A is located approximately on this axis.

The shown or the correspondingly contemplated disposition of the suspension elements A and B have the result that the pair of support forces resulting from the starting moment $M_1 = P_1 \cdot d$ in the suspension elements A and B causes a shifting in a plane perpendicular to the plane of the carrying members 40 provided at the bearing arms 28, 30. These carrying members are held in elastic bearing bodies 38 of the suspension elements and are preferably constructed of rubber. The carrying members 40 are preferably constructed of cylindrical bolts.

In the case of this shifting, a straight line c—c connecting the two suspension elements A, B with one another is rotated around a virtual swivel axis 42 located perpendicular to it and parallel to the axis of the rear axle shafts 24, 26. By this rotation, the carrying member 40 of the suspension element A in the elastic body 38 moves correspondingly upward and that of the suspension element B moves correspondingly downward.

The position of the virtual swivel axis 42 in the space between the suspension elements A and B, is determined by a corresponding coordination of the stiffnesses of the bearing bodies 38 of the suspension elements. The swivel axis 42 could therefore coincide with the axis of the rear axle shafts or if, for example, a rigid connection is assumed in Point B, could coincide with the suspension element B, according to contemplated embodiments.

In addition, the arrangement of the suspension elements A, B and C has the result that the pair of supporting forces in the suspension elements B and C resulting from the cardan shaft moment $M_2 = P_2 \cdot e$ causes a movement of the carrying elements 40 as a function of the respective stiffnesses of the bearing bodies 38. To the movement resulting from the starting moment $M_1$ that is directed in an upward direction in the connecting point between the cardan shaft 22 and the drive shaft 18, a movement is therefore superimposed which, relative to the same point, results from the cardan shaft moment and is directed in downward direction. Thus, opposite movements are obtained with respect to the mentioned connecting point, in which case the axis of rotation for the movement resulting from the starting moment $M_1$ extends approximately through the suspension point A, namely in the longitudinal direction of the vehicle.

In the case of the described arrangement of suspension elements in preferred embodiments of the invention according to FIGS. 1 and 2, in order to obtain the discussed adjustment of the casing in space, the radial stiffness of the bearing body 38 of the suspension element C must be designed to be correspondingly less than that of the bearing bodies of the two other suspension elements A, B. Since the movements of the casing that result are caused by the reaction moments $M_1$ and $M_2$, which are superimposed on one another, all bearing bodies 38 must be designed to be correspondingly stiff only in the radial direction because the pairs of forces corresponding to the moments are supported essentially by two suspension elements respectively.

Figure 3:
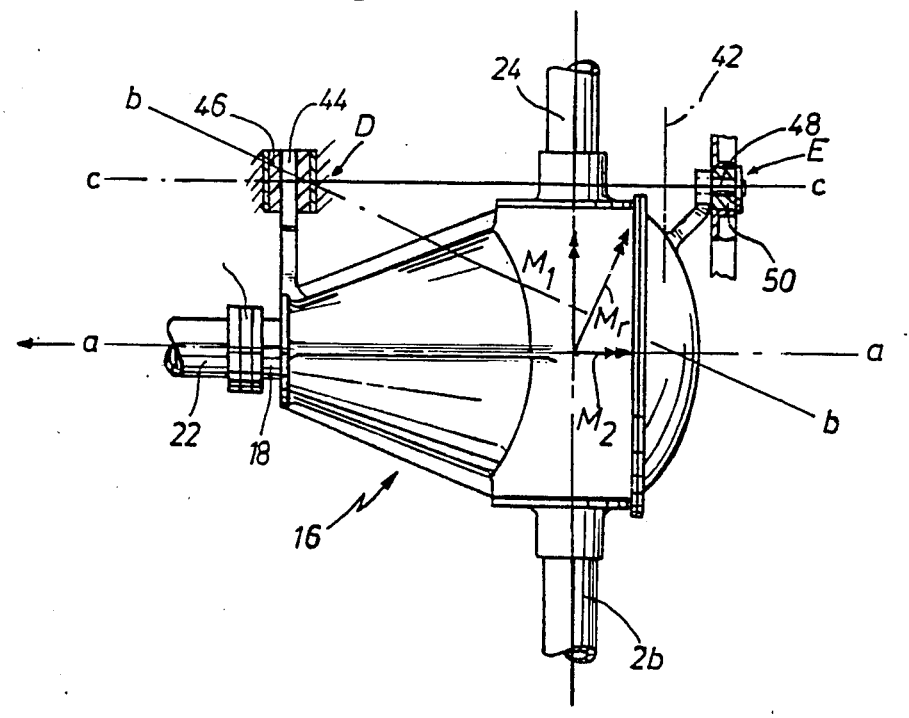
FIG. 3 is a view similar to that of FIG. 2 for a casing suspension that has only two suspension elements, constructed in accordance with another preferred embodiment of the present invention.

A preferred embodiment of the invention shown in FIG. 3 shows that a suspension of the rear axle gear casing 16 is possible by means of only two suspension elements D and E. In this preferred embodiment the rod-shaped carrying member 44 of the front suspension element D in the elastic bearing body 46 extends approximately perpendicular to the longitudinal central axis a—a of the casing, while a bolt-shaped carrying member 48 extends approximately in parallel to it in the bearing body 50 of the suspension element E.

As in the arrangement according to FIG. 2, both suspension elements D and E are arranged with respect to one another in such a way that a connecting line c—c extending through their bearings points extends essentially in parallel to the longitudinal central axis a—a of the casing. Since both suspension elements are of the same construction, the radial stiffness of the bearing body 50 of the rear suspension element E may be selected to be correspondingly lower than that of the front suspension element D, since, due to its physical arrangement, the latter bearing body is stressed by both the starting moment $M_1$ and the cardan shaft moment $M_2$.

Also contemplated by the invention is an embodiment having two suspension elements where the carrying member of the rear suspension element is arranged in its bearing body in a similar fashion to the arrangements of the carrying member of the suspension element D according to FIG. 3.

In contrast to the embodiments shown in the drawings, the straight line c—c extending through the bearing points of the suspension elements A and B or D and E, or the axis of rotation defined by this line may also extend diagonally to the longitudinal central axis of the casing.

Within the scope of the invention, more than three suspension elements may also be provided according to certain embodiments, and when two or three suspension elements are provided, the positions shown in the embodiments are by no means absolutely necessary if, by means of the suitable determination of the elasticities, the desired opposing direction of the swivel movements is achieved in the required magnitudes. For example, two front and one rear suspension element may also be provided at the front.

Figure 5:
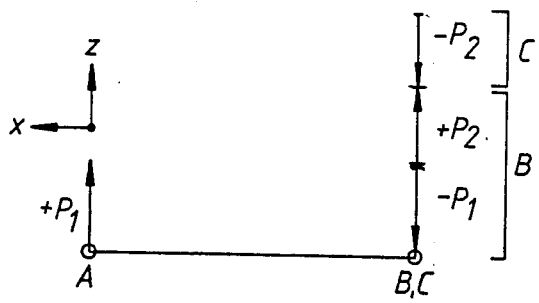
FIGS. 5 and 6 are force diagrams illustrating the direction in which the vertical supporting forces $P_1$ and $P_2$ are effective at A, B and C.
Figure 4:
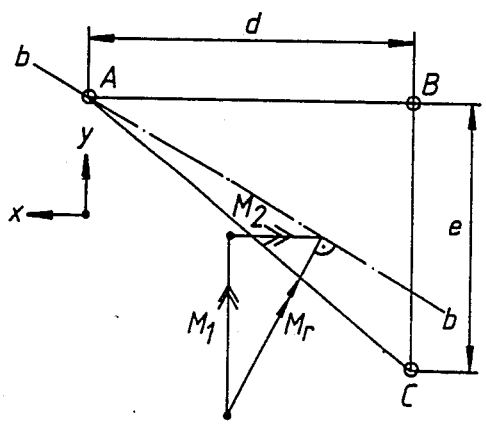
FIG. 4 is a diagram illustrating the effective reaction torques $M_1$ and $M_2$ and also the reaction torque $M_r$ resulting from these.
Figure 6:
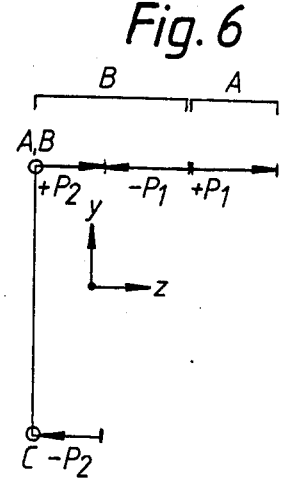

In the case of the described suspension of the rear axle gear casing 16 in accordance with FIGS. 1 and 2 and also FIGS. 4 and 5, the total motion of the same under the resulting reaction torque $M_r$ is divided up into two superimposed swivel motions in accordance with the starting moments $M_1$ ($P_1 \cdot d$) and $M_2$ ($P_2 \cdot e$). The swivel motion resulting from the starting moment $M_1$ and occurring around the axis 42 is supported in A and B. The swivel motion resulting from the starting moment $M_2$, around the axis a—a, is supported in B and C. Apparent from FIG. 5 (corresponding to FIG. 4 tilted upwardly through 90°—Z direction —) is the direction in which the supporting forces at A, B and C resulting from the starting moment $M_1$ and also from FIGS. 5 and 6 (FIG. 6 corresponds to FIG. 4 tilted through 90°) the direction in which the supporting forces at B and C resulting from the starting moment $M_2$ are effective. The swivel motion resulting from the starting moment $M_1$, around the axis 42, causes in A an upwardly directed supporting force $P_1$ and in B a downwardly directed, equally large supporting force $P_1$.

$$A = +P_1; B = -P_1$$

$|A| = |B|$ with respect to $M_1 = M_1/d = P_1$

The swivel motion resulting from the starting moment $M_2$, around the axis a—a, causes in B an upwardly directed supporting force $P_2$ and in C a downwardly directed supporting force $P_2$ $$B = +P_2; C = -P_2$$

$|C| = |B|$ with respect to $M_2 = M_2/e = P_2$.

Summary of the supporting forces in the Z direction engaging at A, B and C (FIGS. 5 and 6):
 suspension element $A = +P_1$
 suspension element $B = -P_1 + P_2$
 suspension element $C = -P_2$.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A suspension system for a rear axle gear casing for a motor vehicle comprising:
 a rear axle gear casing:
 a rear axle shaft;
 a cardan shaft;
 a connecting means;
 a drive shaft, said drive shaft extending outward from and along a horizontally extending central longitudinal axis (a—a) of said gear casing, said drive shaft being drivingly connected to said cardan shaft by means of said connecting means;
the rear axle shaft extending outwardly from and along a horizontal lateral central axis of said gear casing and at right angles to said longitudinally extending axis,
at least two suspension means (A, B; D, E) having different stiffnesses and arrangements for supporting said gear casing with respect to a body of the motor vehicle;
the carban shaft being responsive to a torque input thereto from an engine transmission which is resisted by the drive shaft thus causing a first torque input to the gear casing about said longitudinal axis,
the axle shaft being response to a second torque input thereto from a starting reaction of the motor vehicle which causes a second torque input to the gear casing about said lateral axis and at a right angle to said longitudinal axis,
said first and second torque inputs to the gear casing resulting in a single torque input to the gear casing along a third horizontal axis extending horizontally outwardly from the gear casing and at an angle with respect to said first and second torque inputs,
said at least two suspension means acting as a force coupling resting means to absorb the said resulting torque force on the gear casing,
said at least two suspension means being located horizontally in generally the same horizontal plane and generally in longitudinal alignment with one another, said same horizontal plane being located either above or below a plane defined by the drive shaft and the rear axle shaft,
said generally longitudinal alignment being parallel to and laterally spaced from the aforementioned longitudinal orientation of said drive shaft, and
wherein one of said at least two suspension means is located on one side of the drive shaft and forward of the axle shaft and another of said at least two suspension means being located on the same side of the said drive shaft and rearward of the axle shaft when viewed at right angles to said longitudinal alignment.

2. A suspension system according to claim 1, wherein the rear axle gear casing is rigidly fastened to a front and a back carrying member, said carrying members disposed in elastic bearing bodies of the at least two suspension means D, E, wherein the front carrying member extends generally perpendicular to the longitudinal central axis (a—a) of the axle gear casing, and wherein the back carrying member extends generally perpendicular to the longitudinal central axis (a—a) of the axle gear casing.

3. A suspension system according to claim 2, wherein the at least two suspension means (D, E) are designed to be radially stiff with respect to the torque from the starting reaction of the motor vehicle and wherein the suspension means (E) located behind the rear axle shaft is torsionally soft with respect to the torque from the input transmission.

4. A suspension system according to claim 2, wherein the resulting torque force acts on the gear casing at a point between the at least two suspension means which causes a rotational force to be applied at a point located in said longitudinal alignment of said at least two suspension means which last mentioned point is adjacent to but separated from the axle shaft.

5. A suspension system according to claim 1, wherein the rear axle gear casing is rigidly fastened to a front and a back carrying member, said carrying members disposed in elastic bearing bodies of the at least two suspension means (D, F), and wherein the carrying members held in the two bearing bodies of the suspension means (D, E) are arranged generally perpendicular to the longitudinal central axis (a—a) of the axle gear casing.

6. A suspension system according to claim 5, wherein the two suspension means (D, E) are radially stiff with respect to both the torque from starting and the torque from the input transmission.

7. A suspension system according to claim 5, wherein the resulting torque force acts on the gear casing at a point between the at least two suspension means which causes a rotational force to be applied at a point located in said longitudinal alignment of said at least two suspension means which last mentioned point is adjacent to but separated from the axle shaft.

8. A suspension system according to claim 1, wherein said at least two suspension means includes a third suspension means (C) being located on the opposite side of the longitudinal central axis (a—a) from the at least two generally longitudinally aligned suspension means and wherein the third suspension means (C) has less radial stiffness than the two other suspension means (A and B).

9. A suspension system according to claim 8, wherein the three suspension elements (A, B, C) are located in generally the same horizontal plane (b—b).

10. A suspension system according to claim 9, wherein said same horizontal plane containing the three suspension means (A, B, C) is located above a plane defined by the drive shaft and the rear axle shaft.

11. A suspension system according to claim 8, wherein two of said at least two suspension means (B, C) are located rearward of the rear axle shaft.

12. A suspension system according to claim 11, wherein the two suspension means (B, C) located rearward of the rear axle shaft are located one on each side of the central longitudinal axis of the gear casing.

13. A suspension system according to claim 8, wherein the resulting torque force acts on the gear casing at a point between the at least two suspension means which causes a rotational force to be applied at a point located in said longitudinal alignment of said at least two suspension means which last mentioned point is adjacent to but separated from the axle shaft.

14. A suspension system according to claim 1, wherein the resulting torque force acts on the gear casing at a point between the at least two suspension means which causes a rotational force to be applied at a point located in said longitudinal alignment of said at least two suspension means which last mentioned point is adjacent to but separated from the axis shaft.

* * * * *